US006597821B1

United States Patent
Bohnert et al.

(10) Patent No.: US 6,597,821 B1
(45) Date of Patent: Jul. 22, 2003

(54) FIBER LASER SENSOR FOR MEASURING DIFFERENTIAL PRESSURES AND FLOW VELOCITIES

(75) Inventors: Klaus Bohnert, Oberrohrdorf (CH); Hubert Brändle, Oberengstringen (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 09/869,120

(22) PCT Filed: Dec. 16, 1999

(86) PCT No.: PCT/CH99/00607

§ 371 (c)(1),
(2), (4) Date: Jun. 25, 2001

(87) PCT Pub. No.: WO00/39552

PCT Pub. Date: Jul. 6, 2000

(30) Foreign Application Priority Data

Dec. 28, 1998 (DE) .......................... 198 60 410

(51) Int. Cl.⁷ .............................. G02B 6/100
(52) U.S. Cl. ........................................ 385/12
(58) Field of Search ................ 385/12, 11, 13

(56) References Cited

U.S. PATENT DOCUMENTS

| | | | | |
|---|---|---|---|---|
| 4,078,432 A | * | 3/1978 | Stewart ........................ | 73/705 |
| 4,313,192 A | | 1/1982 | Nelson et al. | |
| 5,305,335 A | * | 4/1994 | Ball et al. .................... | 372/102 |
| 5,414,507 A | * | 5/1995 | Herman et al. ........ | 250/227.21 |
| 5,515,459 A | * | 5/1996 | Farhadiroushan ............ | 385/11 |
| 5,844,927 A | * | 12/1998 | Kringlebotn ................... | 372/6 |
| 6,208,776 B1 | * | 3/2001 | Prohaska et al. ............. | 385/13 |
| 6,339,963 B1 | * | 1/2002 | Torkildsen ................... | 73/197 |

FOREIGN PATENT DOCUMENTS

| | | |
|---|---|---|
| DE | 873304 | 4/1953 |
| DE | 4322291 A1 | 1/1995 |
| EP | 0209721 A1 | 1/1987 |
| EP | 0466623 A1 | 1/1992 |
| WO | WO94/17366 | 8/1994 |

OTHER PUBLICATIONS

"Polarimetric fiber laser sensors", Kim, et al., Optics Letters 18, Feb. 15, 1993, No. 4, New York, New York, USA, pp. 317–319.

"Compensated Polarimetric Sensor using Polarisation–Maintaining Fibre in a Differential Configuration", Dakin, et al., Electronics Letters, Jan. 5, 1984, vol. 20, No. 1, pp. 51–53.

* cited by examiner

Primary Examiner—Robert H. Kim
Assistant Examiner—Richard Kim
(74) Attorney, Agent, or Firm—Burns, Doane, Swecker & Mathis, L.L.P.

(57) ABSTRACT

The present invention relates to a fiber laser pressure sensor 1 which is suitable in particular for measuring differential pressures and flow velocities $v_1$ in oil boreholes. The fiber laser 2 according to the invention comprises two sensor fiber segments 5a, 5b subjected to different pressure loading, in which segments a birefringence proportional to the differential pressure $\Delta p = p_1 - p_2$, and consequently a beat frequency, is induced between the polarization modes or spatial modes in the fiber laser 2. Exemplary embodiments with polarimetric monomode fibers 5a, 5b and/or with elliptical two-mode fibers 5a, 5b are specified. Furthermore, pressure-resistant multichamber sensor housings 25 and wavelength division multiplex arrangements are disclosed for the fiber laser pressure sensor 1. One advantage is that the pressure signal is wavelength-coded and thus highly insensitive to interference. It can be read out directly fiber-optically over large distances between the passively optical sensor head 1 and the optoelectronic measuring device 12, 17. One application concerns the measurement of a flow velocity $v_1$ with the aid of a Venturi tube 23.

16 Claims, 10 Drawing Sheets

FIBER LASER SENSOR FOR MEASURING DIFFERENTIAL PRESSURES AND FLOW VELOCITIES

FIELD OF THE INVENTION

The present invention relates to the field of optical pressure measurement. It is based on a fiber-optic laser according to the preamble of claims 1 and 14.

BACKGROUND OF THE INVENTION

In oil production it is necessary to monitor boreholes with regard to pressure and temperature. ID the borehole, the liquid pressures can be up to approximately 100 MPa (1000 bar) and the temperatures can be up to above 200° C. Electrical sensors, such as e.g. piezoresistors, piezoelectric elements, capacitive probes or crystal resonators, or optical pressure sensors, such as e.g. Fabry-Perot resonators, or elasto-optical sensors, are often used for pressure measurement up to approximately 170° C.

A polarimetric fiber laser sensor in accordance with the preamble is disclosed in the article by H. K. Kim et al., "Polarimetric fiber laser sensors", Optics Letters 18 (4), pp. 317–319 (1993). An Nd-doped fiber with a round core and dichroically mirrored ends which are transparent to pumping light is used as laser and pressure sensor fiber. Unidirectional lateral pressure on the fiber induces a birefringence and thus a frequency shift between the linear inherent polarizations of longitudinal modes. The resulting beat frequency in the polarimetric interference signal can be measured very easily using a frequency counter.

In accordance with the article by G. A. Ball et al., "Polarimetric heterodyning Bragg-grating fiber-laser sensor", Optics Letters 18 (22), pp. 1976–1978, instead of dichroic mirrors, it is also possible to use two fiber Bragg-gratings written directly into the fiber core for the purpose of bounding the laser cavity.

In both arrangements, hydrostatic or all-round isotropic pressures cannot be measured. The measurement of steady-state or absolute pressures is difficult or impossible since the operating point, i.e. the beat frequency in the unloaded state, can fluctuate in an uncontrolled manner as a result of temperature fluctuations, changes in optical parameters owing to material fatigue and the like.

Serial multiplexing of passive fiber Bragg-grating sensors is disclosed e.g. in U.S. Pat. No. 4,761,073. A plurality of fiber Bragg-gratings with different reflection wavelengths are written in along a sensor fiber. Each grating can be read out wavelength-selectively and/or by means of time-resolved measurement with a pulsed light source.

U.S. Pat. No. 5,515,459 discloses a fiber-optic pressure sensor for measuring an isotropic pressure, the sensor fiber having two side-hole fiber segments with a structure that is not rotationally symmetrical. The two fiber segments are arranged such that they are rotated by 90° with respect to one another, and are exposed to the same isotropic pressure, the side holes of one fiber segment being exposed to the isotropic pressure, but the side holes of the other fiber segment not being so exposed. In this case, the rotation of the two fiber segments by 90° serve for temperature compensation.

J. P. Darkin and C. Wade, "Compensated polarimetric sensor using polarization-maintaining fiber in a differential configuration", Electron. Lett. Vol. 20, No. 1, pages 51–53, 1984, disclose a fiber-optic temperature sensor in which two fiber segments are arranged such that they are rotated by 90° with respect to one another, in order to compensate common-mode temperature changes and isotropic pressure changes.

SUMMARY OF THE INVENTION

It is an object of the present invention to specify a fiber laser pressure sensor which is suitable for measuring differential pressures in liquids or gases and is distinguished by a simple construction, a good measurement sensitivity and a large measurement range. This object is achieved according to the invention by means of the features of claims 1 and 14.

The invention consists in arranging in the laser cavity of a fiber laser, in addition to the laser-amplifying fiber, two sensor fiber segments which are not rotationally symmetrical and have a mutually opposite pressure dependence of the birefringence, and in providing means for determining a birefringence-induced beat frequency. By virtue of the rotational asymmetry, an isotropic pressure is converted into an anisotropic birefringence in the fiber laser. The mutually opposite pressure dependence has the effect that the total birefringence and hence the induced beat frequency is proportional to the pressure difference at the fiber segments.

One exemplary embodiment shows a fiber laser differential pressure sensor with two polarimetric sensor fiber segments. By virtue of 90° rotation between the segments, it is possible to achieve a coupling between the polarization modes and, as a result, an opposite pressure sensitivity and inherent compensation of temperature effects.

Another exemplary embodiment shows a fiber laser differential pressure sensor with two spatially bimodal sensor fiber segments. The opposite pressure sensitivity and temperature compensation can be achieved by coupling between the spatial modes at a transversely offset splice between the segments.

A further exemplary embodiment represents a serial arrangement of a plurality of fiber laser differential pressure sensors with different emission wavelengths, which are fed via a common pumping light source and whose pressure-proportional beat frequencies are detected in a wavelength-selective manner.

Additional exemplary embodiments relate to pressure housings for fiber lasers, in the case of which the sensor fiber segments are in pressure exchange with two media and, if appropriate, the laser-amplifying fiber and the fiber Bragg-gratings effective as laser mirrors are shielded from the pressures.

Further embodiments, advantages and applications of the invention emerge from the dependent claims and from the following description with reference to the figures.

BRIEF DESCRIPTION OF THE DRAWINGS

In the figures, for a differential pressure sensor according to the invention.

In the figures, identical parts are provided with identical reference symbols.

DESCRIPTION OF THE PREFERRED EMBODIMENTS

Figure 1:
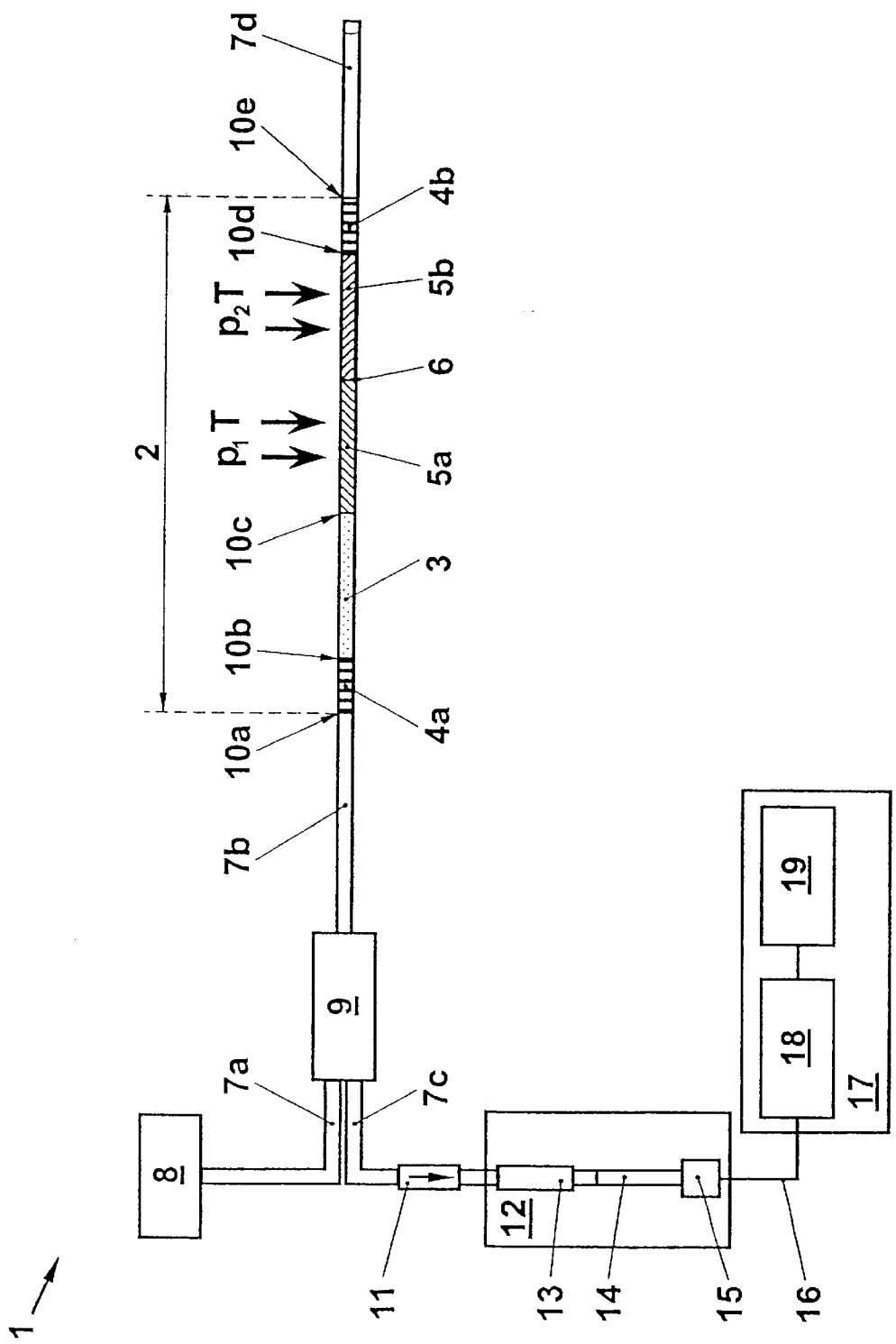
FIG. 1 shows a polarimetric fiber laser differential pressure sensor.

According to FIG. 1, a fiber laser differential pressure sensor according to the invention comprises a pumping light source 8, feed fibers 7a–7d, a fiber laser 2, which has a laser-amplifying fiber 3 and at least two end reflectors 4a, 4b, a detection unit 12 and an electronic evaluation unit 17. At least two sensor fiber segments 5a, 5b with a structure that is not rotationally symmetrical and is thereby anisotropically pressure-sensitive are arranged between the end reflectors 4a, 4b. The sensor fiber segments 5a, 5b have an opposite pressure sensitivity of the birefringence and the detection unit 12 and electronic evaluation unit 17 comprise means for determining a birefringence-induced beat frequency. The beat frequency is thus largely proportional to the difference between the pressures $p_1$ and $p_2$ which act on the two sensor fiber segments 5a, 5b of the fiber laser 2. The opposite or differential pressure sensitivity can be realized, in particular, by the fact that the sensor fiber segments 5a, 5b carry a plurality of polarization modes and/or spatial modes and an optical coupling with mode exchange is provided between the sensor fiber segments 5a, 5b. The sensor fiber segments 5a, 5b are thus optically connected to one another in such a way that their fiber modes (polarization modes, spatial modes) are differentially coupled, i.e. cross-coupled.

Figure 7A:
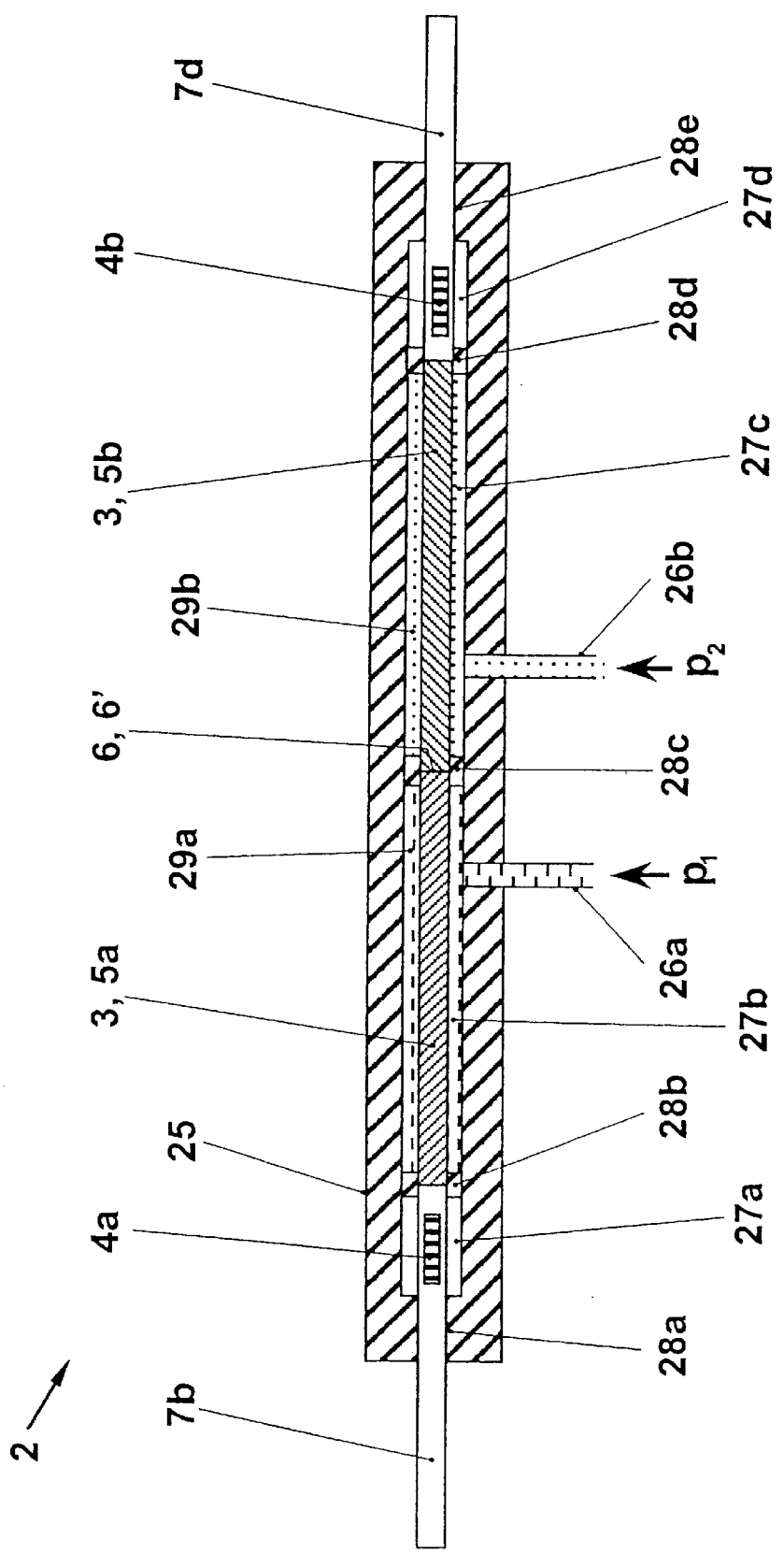

The sensor fiber 5a, 5b is typically birefringent, in particular strongly birefringent or polarization-maintaining. A monomode fiber (FIG. 1) acting as a polarimeter or a fiber with an elliptical core (FIG. 7) which can be used as a two-mode fiber are highly suitable. In the reflection configuration illustrated, the pumping light source 8, the fiber laser 2 and the detection unit 12 are optically connected by means of a preferably wavelength-selective fiber coupler 9. The detection unit 12 has means for detecting a beat frequency in the received light from the fiber laser 2, in particular an active polarization monitoring arrangement 13, an analyzer 14 and a detector 15 for the light transmitted by the fiber laser pressure sensor 1. As an alternative to the polarization monitoring arrangement 13, the components 7b–7d, 9, 11 may be designed such that they are polarization-maintaining, and be used with same orientation as the analyzer 14. As a further alternative, the beat signal can be generated directly outside the fiber laser 2 by a fiber polarizer 14 (not illustrated) which is oriented at an angle ≈0° or 90°, in particular at 45°, to the birefringence axes of the sensor fiber 5a, 5b. The detector 15 is connected via a signal line 16 to the electronic evaluation unit 17, which, for its part, has means for determining the beat frequency, in particular a frequency filter 18 and a frequency counter 19. The fibers 3, 4a, 4b, 5a, 5b are typically connected to one another and to the feed fibers 7b, 7d by splices 10a–10f and form a mechanically stable construction. An optical isolator 11 between the fiber coupler 9 and the detection unit 12 is useful for suppressing retroreflections into the fiber laser 2.

Figure 2:
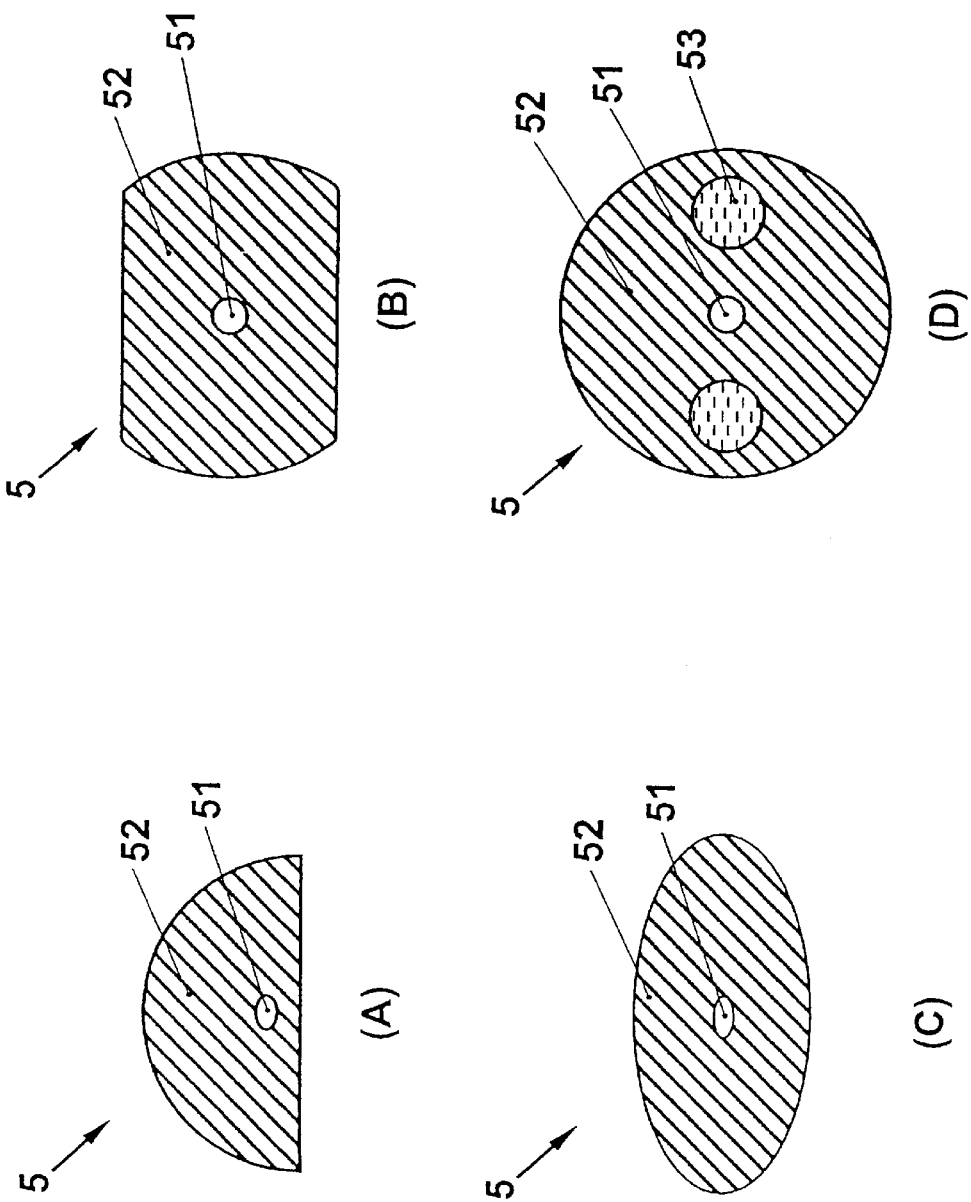
FIG. 2 shows examples of sensor fibers that are not rotationally symmetrical.

The rotationally asymmetrical structure of the sensor fiber segments 5a, 5b serves for creating an anisotropy for converting the isotropic pressures $p_1$, $p_2$ of two fluids 29a, 29b into a birefringence of the sensor fiber 5a, 5b. In addition to fibers with an elliptical core (shape-induced birefringence), those having a "bow-tie" or "panda" structure (stress-induced birefringence) are also customary. These types are presented in the article by K.-H. Tsai et al., "General Solutions for Stress-Induced Polarization in Optical Fibers", Journal of Lightwave Technology Vol. 9, No. 1, 1991. FIG. 2 shows, as further examples of birefringent sensor fibers 5a, 5b, a fiber (A) with an elliptical or round core 51 and ground cladding 52 ("D-shape" structure), a fiber (C) with an elliptical core and an elliptical fiber cladding and a fiber (D) with a round core 51, a round cladding 52 and side holes 53 ("side-hole" structure). A special feature is represented by the fiber (B)—free from birefringence in the unloaded state—with a round core 51 and a partially ground, rotationally asymmetrical fiber cladding 52. The fiber cladding 52 can be ground on one side, two sides or a plurality of sides, with the result that isotropic pressure cancels the degeneracy of the polarization modes and induces birefringence.

The sensor fiber segments 5a, 5b advantageously carry precisely two polarization modes (polarimetric fibers) and are rotated by 90° with respect to one another or they carry precisely two spatial modes (two-mode fiber) and are rotated by 0° with respect to one another. In particular, the sensor fiber segments 5a, 5b are of the same type and have the same length. As a result, a temperature dependence of the static and pressure-induced birefringence can inherently be compensated. Furthermore, an intermediate fiber 30 may be arranged between the sensor fiber segments 5a, 5b.

The end reflectors are preferably fiber Bragg-gratings 4a, 4b. In particular, the Bragg wavelength $\lambda_B$ is a measure of the temperature. In order to determine the temperature-induced Bragg wavelength shift (approximately 10.3 pm/° C. at 1550 nm), received light is branched off e.g. using a fiber coupler and is analyzed in a spectrometer (not illustrated). The fiber Bragg-gratings 4a, 4b can be written directly into the laser-amplifying fiber 3 and/or into the sensor fiber segments 5a, 5b. In order to improve the insensitivity to thermal drift, the fiber Bragg-gratings 4a, 4b can be chosen with a different bandwidth, preferably $\Delta v_B^{(1)}=0.6$ nm and $\Delta v_B^{(2)}=0.2$ nm. The reflectivities of the fiber Bragg-gratings 4a, 4b are typically 99% and 90%. Instead of fiber Bragg-gratings 4a, 4b it is possible to provide reflective dichroic layers.

Figure 3:
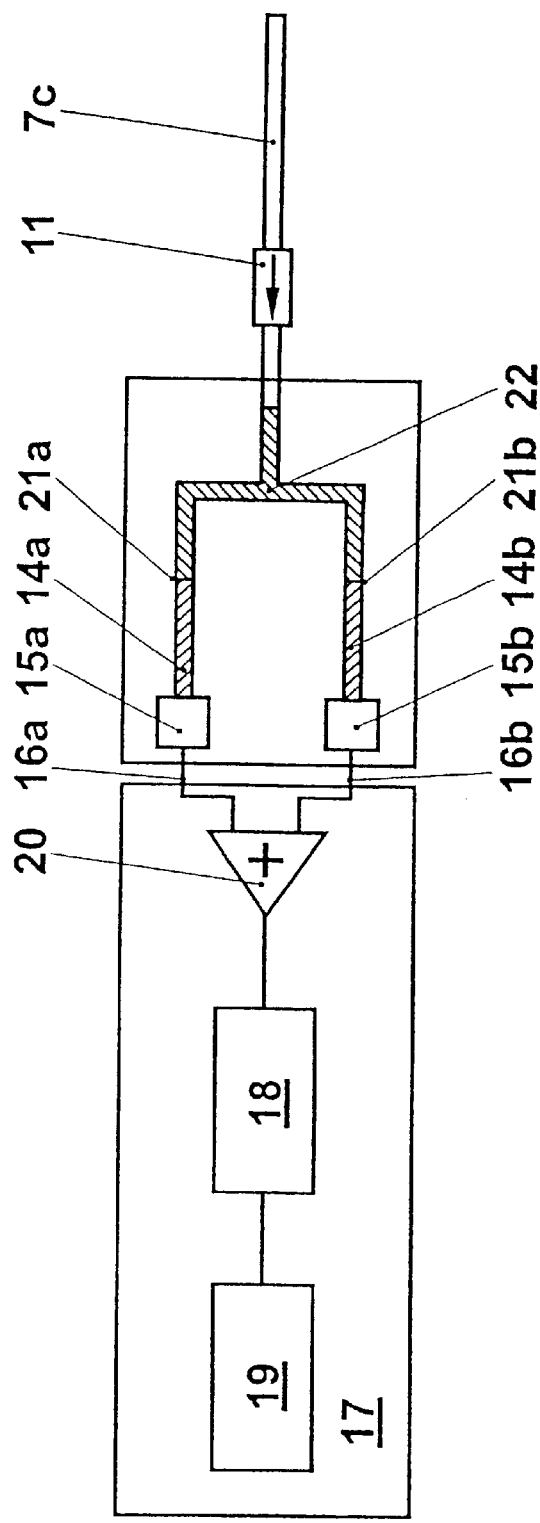
FIG. 3 shows an alternative polarimetric detection unit.

FIGS. 1 and 3 show arrangements for generating and detecting the beat frequency(-ies) for polarimetric sensor fibers 5a, 5b. The light emitted by the fiber laser 2 is (predominantly) coupled out on the side of the less reflective fiber Bragg-grating 4a (FIG. 1, reflection configuration) or 4b (transmission configuration not illustrated). In the fiber coupler 9, the emission light is separated from the pumping light on account of the shifted wavelength. Retroreflections into the fiber laser 2 are suppressed by the preferably fiber-optic isolator 11 and by an obliquely ground portion of the end of the fiber 7d. In the detection unit 12, the linear polarization modes x,y are made to interfere by the analyzer 14. The orientation angle of the analyzer 14 relative to the axes of the polarization modes x,y is preferably 45°. The analyzer 14 may be embodied solid-optically or more simply as a fiber polarizer 14. In the detector 15, the interference signal is converted into an intensity-proportional electrical signal. The detector 15, typically a photodiode 15, requires for this purpose a bandwidth which is greater than the beat frequency to be measured. In the frequency filter 18, the desired beat signal is separated and fed to a frequency counter 19. Alternative embodiments of the electronic evaluation unit 17 may comprise a radio-frequency spectral analyzer, an oscilloscope or other high-frequency or microwave measuring instruments.

FIG. 3 shows an alternative beat frequency detection according to the invention. In this case, the detection unit 12 comprises, for the purpose of splitting, polarization analysis and detection of the received light from a fiber laser 2, a polarization-maintaining fiber coupler 22 with, on the output side, two analyzers 14a, 14b oriented at 0° and 45°, and two detectors 15a, 15b. The analyzers are preferably fiber polarizers 14a, 14b, which are connected to the fiber coupler 22 via splices 21a, 21b. The detectors 15a, 15b are connected via signal lines 16a, 16b to a summer 20, which is connected to a frequency filter 18 and a frequency counter 19 for determining the beat frequency. The beat frequency then represents a highly precise measure of the pressure difference $\Delta p=p_1-p_2$ between the two sensor fiber segments 5a, 5b of the fiber laser 2. A further alternative for generating interference between the polarization modes consists in producing a strong coupling between them, for example by microbending of the fiber downstream of the optical isolator 11.

Figure 4:
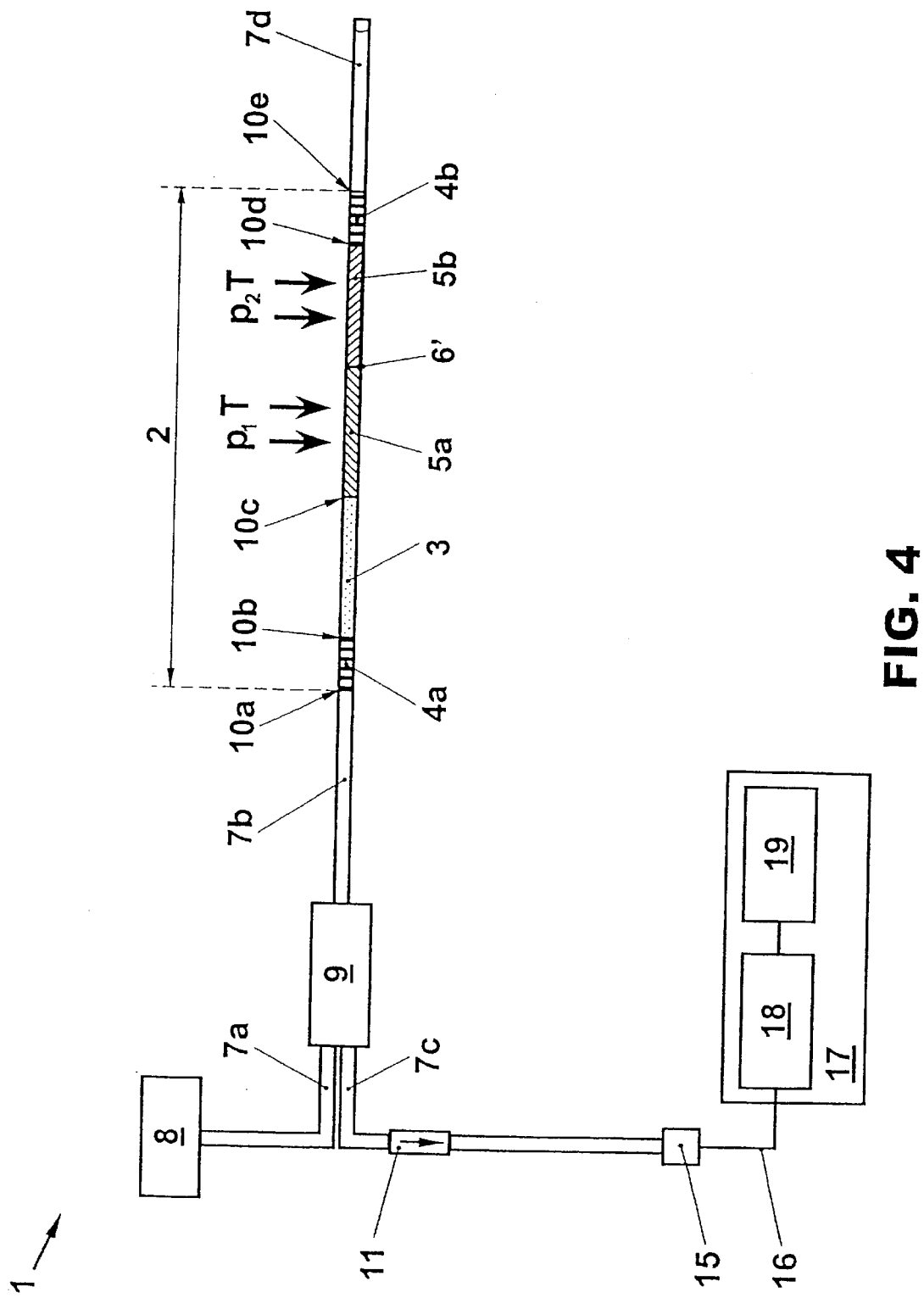
FIG. 4 shows a transversely bimodal fiber laser differential pressure sensor.

FIG. 4 represents a greatly simplified variant with respect to FIG. 1, in the case of which a spatially bimodal sensor fiber 5a, 5b with an elliptical core is used instead of a spatially monomodal one. The interference between the spatial modes $LP_{01}$ and $LP_{11}^{rectilinear}$ is formed inherently on account of identical directions of polarization of the spatial modes. This obviates the need for a polarization monitoring arrangement 13 and an analyzer 14 upstream of the detector 15. A mutually oppositely identical pressure sensitivity and an inherent temperature compensation can be realized by means of parallel alignment (0° angle of rotation) of bimodal sensor fiber segments 5a, 5b of the same length and of the same type and by means of a transverse offset of the fiber ends in the splice 6'. A fiber polarizer (not illustrated) is advantageously arranged and in particular inserted with splices, in or beside the fiber laser 2. The spatial modes $LP_{01}$, and $LP_{11}^{rectilinear}$ can then build up oscillations only with a linear polarization and the number of beat frequencies is halved. In particular, the Bragg wavelength $\lambda_B$ is chosen in the spectral region of a vanishing group refractive index birefringence of the sensor fiber 5a, 5b in order to repress the influence of a temperature dependence of the birefringence. The sensor construction in accordance with FIG. 4 is distinguished by a distinctly reduced complexity and by being very well suited to multiplex arrangements in accordance with FIG. 5.

Figure 5:
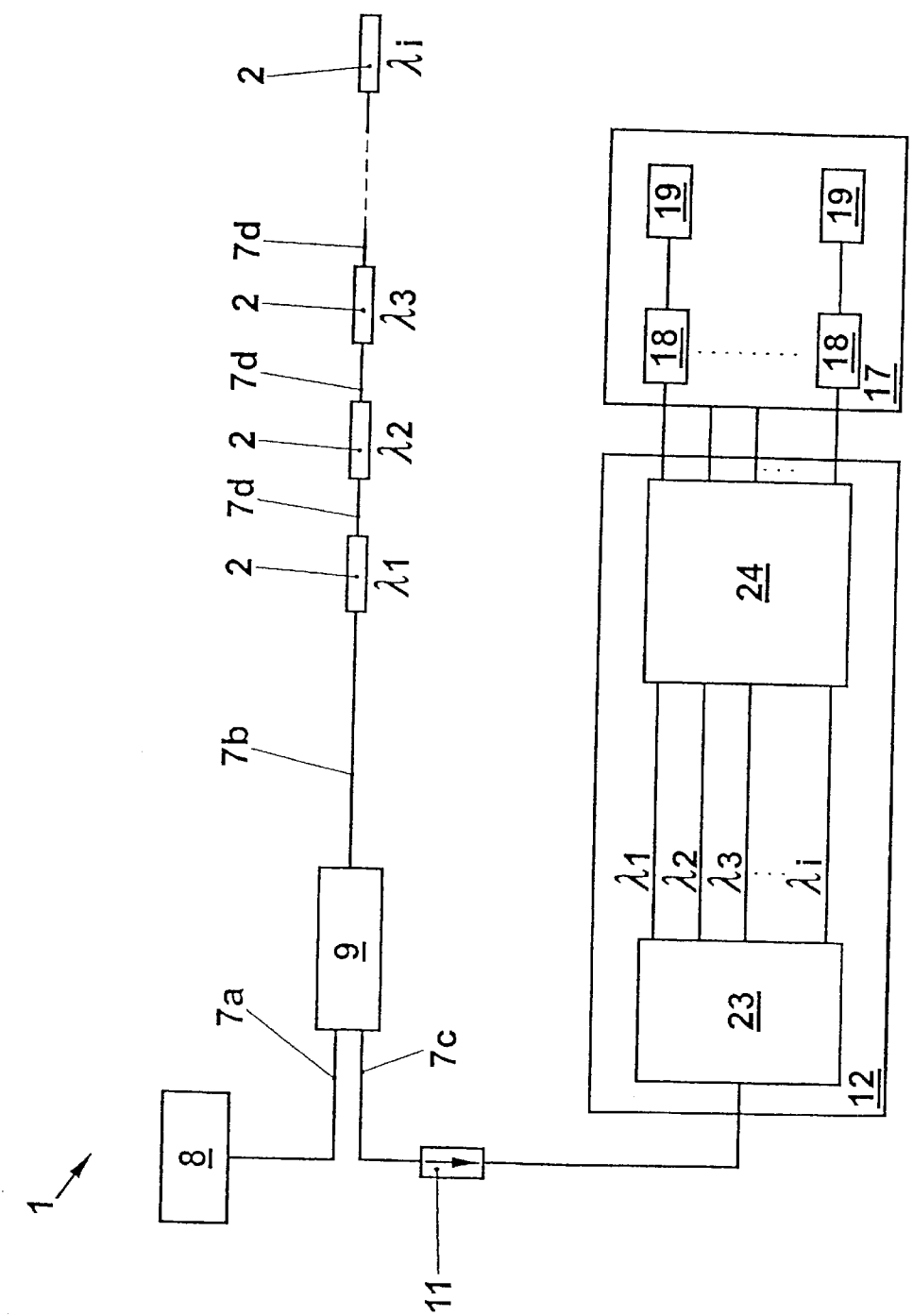
FIG. 5 shows a multiplex arrangement in reflection with a plurality of fiber laser differential pressure sensors with different emission wavelengths.

FIG. 5 shows a multiplex arrangement which comprises a plurality of fiber lasers 2 of different emission wavelengths $\lambda_1, \ldots, \lambda_i$. The fiber lasers 2 are optically connected to a common pumping light source 8 and a detection unit 12. The detection unit 12 has a wavelength division demultiplexer 23 and a multichannel detector 24, which is electrically connected to a multichannel electronic evaluation unit 17. A beat frequency is detected in each channel in the manner described above. In particular, the electronic evaluation unit 17 comprises a frequency filter 18 and a frequency counter 19 for each fiber laser 2. For the serial multiplex arrangement illustrated, the doping concentrations and lengths of the laser-amplifying fibers 3 are chosen such that, in each fiber laser 2, sufficient pumping power is absorbed and sufficient pumping power is transmitted for the subsequent fiber lasers 2. By using separate amplifying fibers 3 and sensor fibers 5a, 5b, the laser behavior and the pressure sensitivity of the sensor 1 can be optimized independently of one another. The spacing between the emission wavelengths is chosen to be large enough that the reflection spectra of all the fiber lasers 2 remain free from overlap even at different temperatures, and spectral separation of the signals in the demultiplexer 23 is possible. Consequently, each fiber laser 2 requires a wavelength window of at least 2.4 nm for a temperature range between 0° C. and 230° C. The multiplex arrangement can also be constructed in parallel. The directions of propagation of pumping light and laser emission are allowed to have the same direction. A wavelength division multiplex arrangement has the advantage that the fundamental construction of the sensor 1 (FIGS. 1, 4), in particular the reflection configuration with a fiber coupler 9 that selects the pumping wavelength, can be preserved and the channel separation can be carried out in a simple manner using the optical wavelength division demultiplexer 23.

The pumping light source 8, the absorption bands of the laser-amplifying fiber 3 and the Bragg wavelengths $\lambda_B$ of the fiber Bragg-gratings 4a, 4b are to be spectrally coordinated with one another in such a way that the laser threshold for relatively few longitudinal modes in the fiber laser 2 is as low as possible. For the two polarization or spatial modes, the longitudinal natural frequencies and, from the latter, the frequency spacings $\Delta v_0$, $\Delta v_0'$ between adjacent longitudinal modes can be determined in a known manner. For sensor fiber segments 5a, 5b of the same type and of the same length, the following holds true, disregarding dispersion effects, $$\Delta v_0 = \Delta v_0' = c/[2 \cdot (n_d \cdot L_d + (n_a + n_b) \cdot L)], \quad (E1)$$

where $n_d$=effective refractive index of the doped fiber 3; $L_d$=length of the doped fiber; $n_a$, $n_b$=effective refractive indices of the coupled-in mode in the two sensor fiber segments 5a, 5b, L=length of the sensor fiber segments 5a, 5b and c=speed of light in a vacuum. The birefringence is of opposite, equal magnitude in the two segments 5a, 5b and the frequencies of the two modes are degenerate. The action of different pressures $p_1$ and $p_2$ on the segments 5a and 5b induces a mutually opposite birefringence in said segments. This results in a total phase shift $$\Delta \phi_{tot} = K_p \cdot \Delta p \cdot L, \quad (E2)$$

where $K_p$=proportionality constant, $\Delta p=p_1-p_2$ pressure difference. This expression is valid in first order and does not take account of higher-order dependencies on pressure or temperature. The natural frequencies of orthogonal modes of the fiber laser 2 are shifted relative to one another by the phase shift $\Delta \phi_{tot}$. This results in differential-pressure-proportional beat frequencies $\Delta v_1$ and $m \cdot \Delta v_0 \pm \Delta v_1$, m=1, 2, 3, . . . An unambiguous pressure measurement range is given by the condition $\Delta v_1 < \Delta v_0/2$ or $v \Delta \phi_{tot} < \pi/2$.

For illustration, some quantitative estimations: the required length of a polarimetric monomode sensor fiber 5a, 5b with an elliptical core ($K_p$=9.5°/(MPa·m) at $\lambda$=1548 nm of the fiber laser 2) is 9.5 cm for a differential pressure measurement range of 100 MPa. The frequency and wavelength spacings between the longitudinal modes result from $L_d$=30 cm, L=10 cm and $n_d$=1.45 as 207 MHz and 1.65 pm. Thus, only few modes are supported by the narrowband fiber Bragg-gratings 4a, 4b and the beat frequencies are hardly widened (line width approximately 10 kHz) and the pressure resolution is very high (approximately 4.8 kPa).

For a transversely bimodal sensor fiber 5a, 5b with an elliptical core ($K_p$=48.9°/(MPa·m) at $\lambda$=1300 nm of the fiber laser 2) the following are found analogously: required length of 1.84 cm for measurement range of 100 MPa and resolution of 0.94 kPa with a line width of 10 kHz. Moreover, "bow-tie" or "panda" fibers are suitable as bimodal sensor fibers 5a, 5b.

In principle, the differential pressure sensor 2 can also be constructed from a polarimetric monomode sensor fiber segment 5a and a transversely bimodal segment 5b.

As is known, dopings with erbium$^{3+}$ (1530 nm–1570 nm; concentration approximately 100 ppm–1000 ppm; pumping light at 1480 nm or 980 nm), praseodymium$^{3+}$ (approximately 1300 nm), neodymium$^{3+}$ (approximately 1060 nm) or thulium$^{3+}$ (approximately 810 nm) can be used for the laser-amplifying fiber 2. Advantages of erbium doping include the very low optical losses of pumping light and induced laser light in the feed fibers 7a–7d, the permissibility of long lead fibers 7a–7d of up to several kilometers and the capability of using standard optical components for the 1550 nm telecommunications window.

Figure 6:
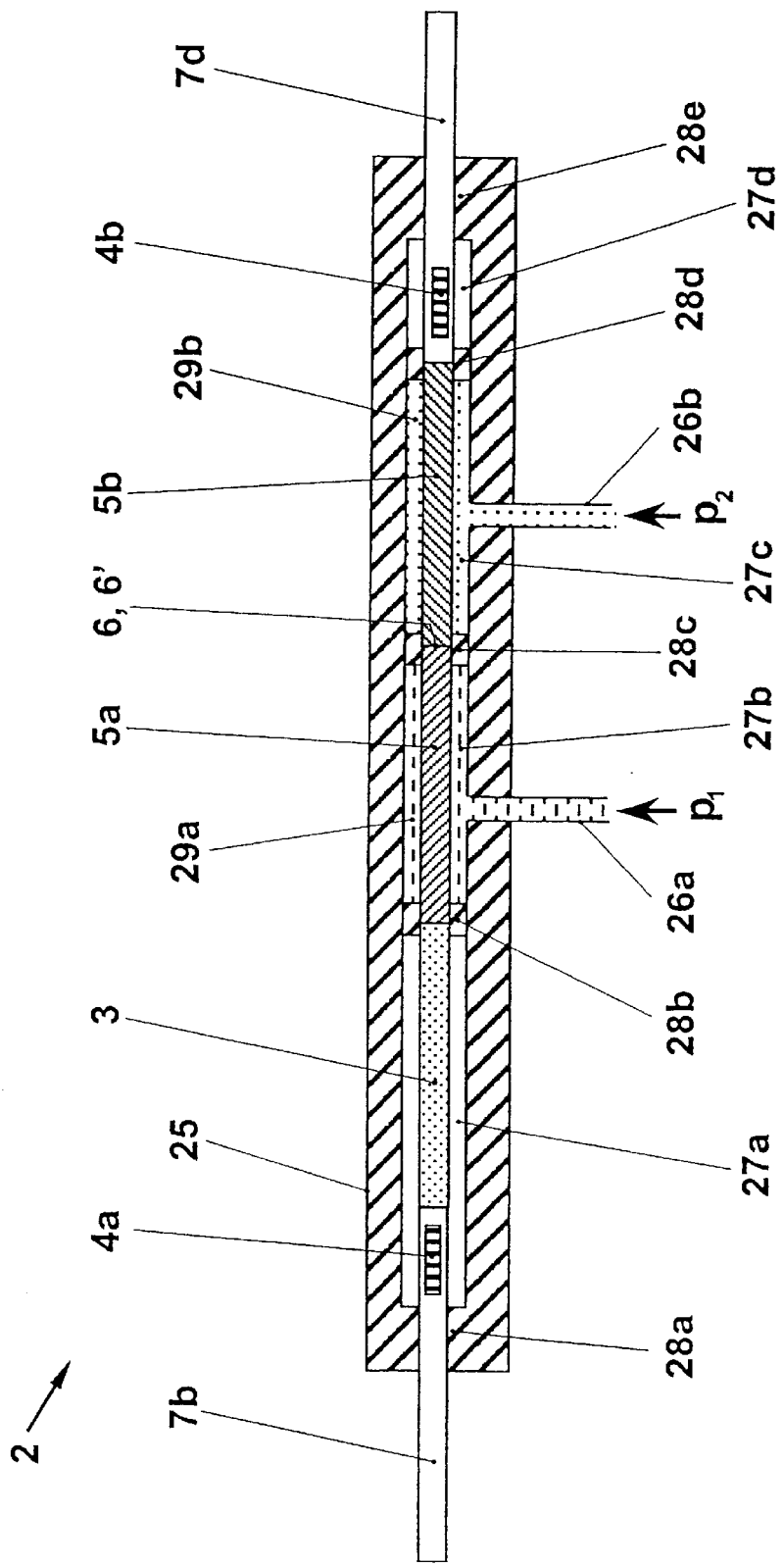
FIGS. 6–8 show different pressure housings for a fiber laser differential pressure sensor.
Figure 7B:
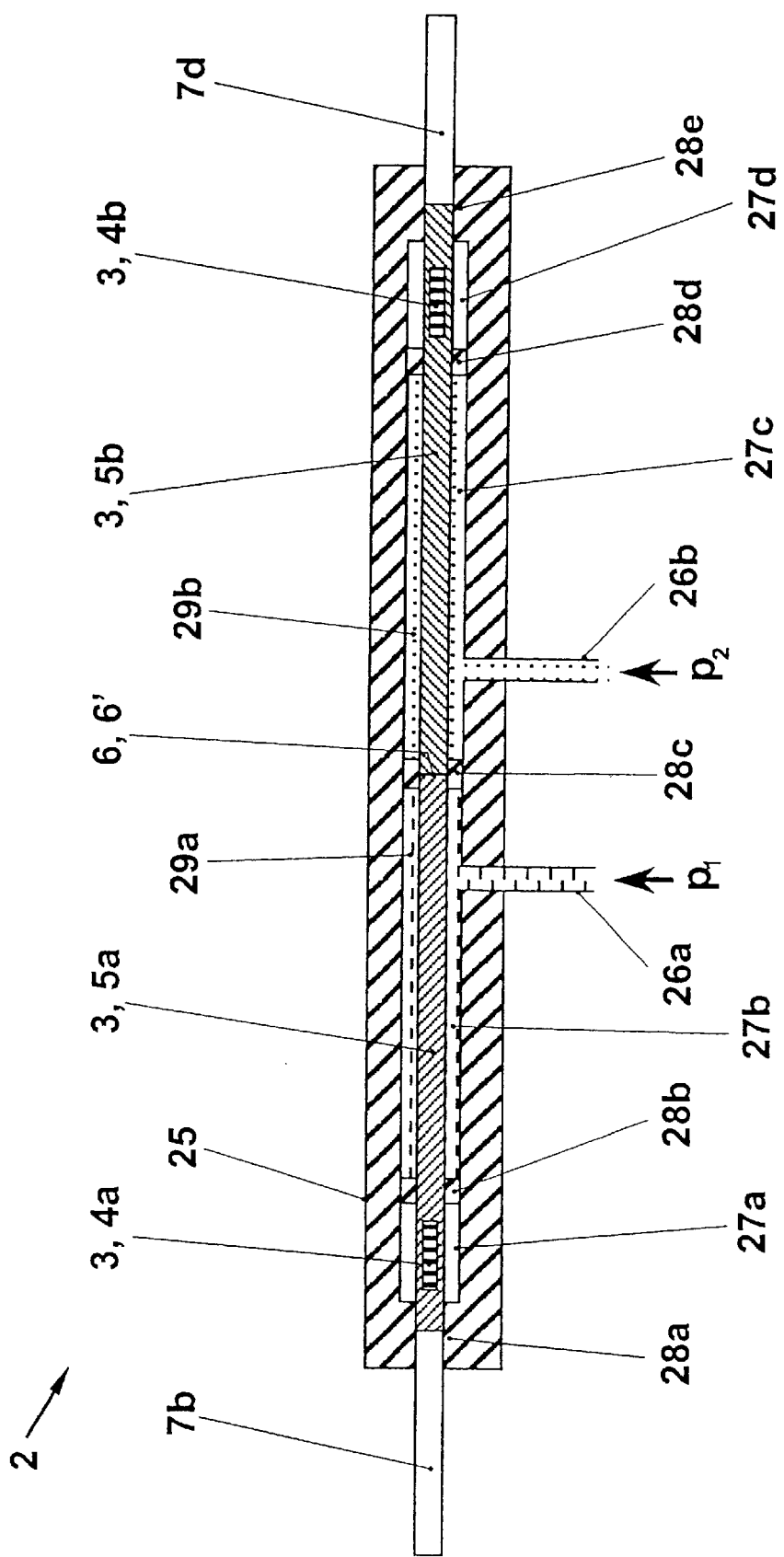
Figure 8:
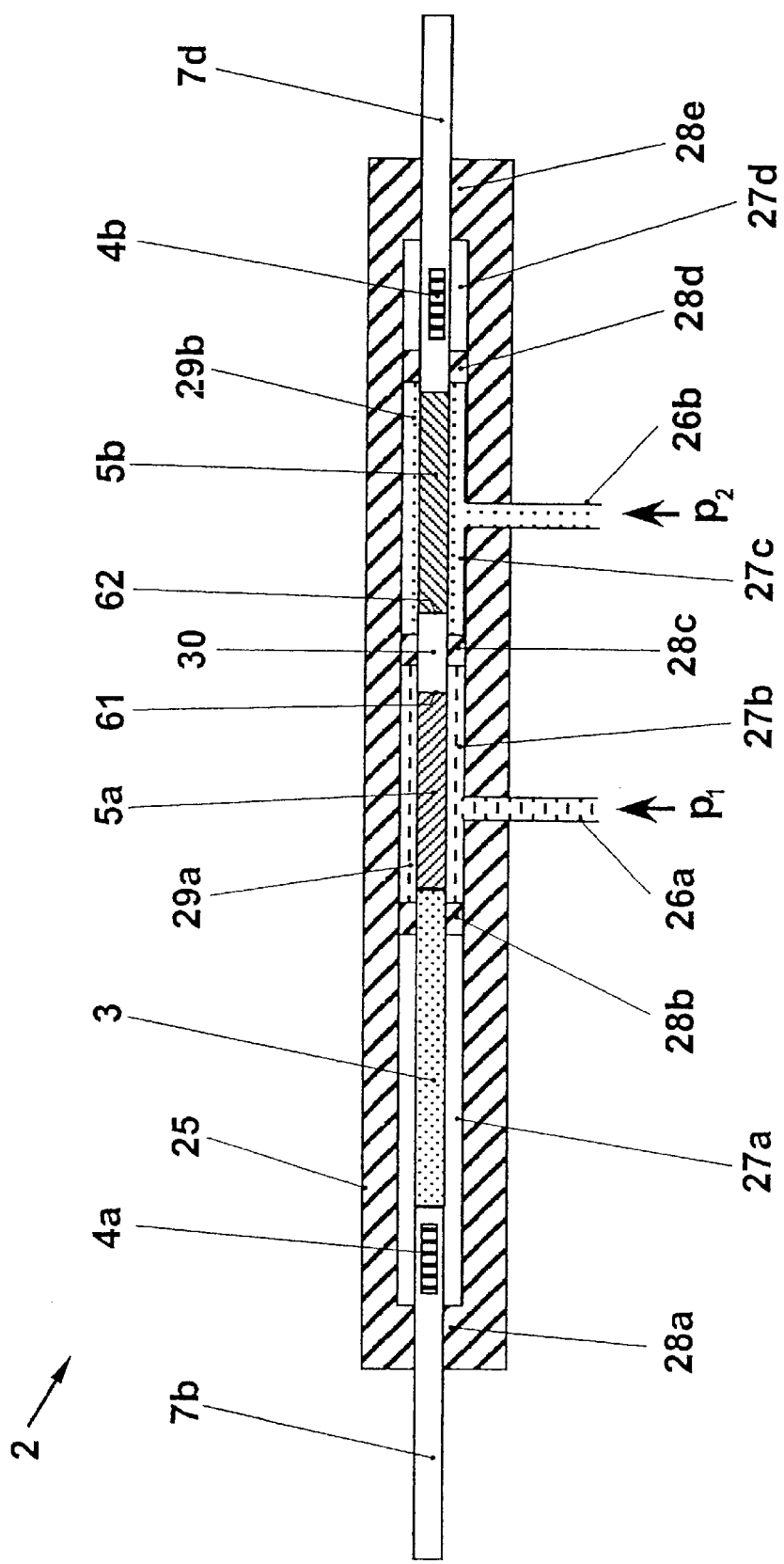

FIGS. 6–8 show exemplary embodiments of pressure housings 25 for the fiber laser differential pressure sensor 2. By means of the transducers 2 or pressure housings 25, the end reflectors 4a, 4b and, if appropriate, the laser-amplifying fiber 3 are shielded from an external pressure and the oppositely pressure-sensitive sensor fiber segments 5a, 5b are exposed to different pressures $p_1$, $p_2$.

For this purpose, the pressure-resistant housings 25 are configured with a plurality of pressure chambers 27a–27d connected by pressure-tight fiber feedthroughs 28a–28e, for accommodating a fiber laser 2. The fibers 3, 4a, 4b, 5a, 5b are fastened in a manner free of stress in the pressure chambers 27a–27d, in order to avoid fiber strain due to thermal or mechanical loading on the housing 25. Separate pressure chambers 27b, 27c are provided for the sensor fiber segments 5a, 5b and, via separate inlets 26a, 26b, are in direct pressure exchange with at least two media 29a, 29b. In particular, additional pressure chambers 27a, 27d are provided for fiber Bragg-gratings 4a, 4b. The laser-amplifying fiber 3 can be arranged in an additional pressure chamber 27a, 27d, preferably together with a fiber Bragg-grating 4a, 4b (FIGS. 6, 8). The laser-amplifying fiber 3 may also comprise the sensor fiber segments 5a, 5b (FIGS. 7a, 7b) and have, in particular, at least one fiber Bragg-grating 4a, 4b (FIG. 7b). As a result, the laser cavity 2 can be shortened, the differential pressure resolution can be increased, and the laser threshold can be lowered.

The housing 25 is typically elongate, in particular cylindrical. The diameter should be a maximum of 10 mm. The length is essentially predetermined by the length of the fiber laser 2. Instead of the inlets 26a, 26b, the housing 25 may have an opening with a pressure diaphragm (not illustrated) for pressure exchange between the media 29a, 29b and a fluid, for example silicone oil, in the transducer 2. In this way, the ambient pressures $p_1$, $p_2$ are transmitted all around onto the sensor fiber segments 5a, 5b, and the latter are protected against direct contact with the media 29a, 29b.

The housing 25 is composed, for example, of corrosion-resistant steel or quartz glass. An internal coating e.g. with gold can reduce the indiffusion of hydrogen. In the case of a single fiber laser 2 or the last in a multiplex arrangement, lead fiber 7d and fiber feedthrough 28d are omitted and the fiber with the fiber Bragg-grating 4b can end within the housing 25. The shielded pressure chambers 27a, 27d are preferably under a vacuum, low-pressure gas or normal pressure.

The housing 25 serves only as mechanical protection for the fibers 3, 4a, 4b, 5a, 5b and for spatial separation of the media 29a, 29b with the pressures $p_1$ and $p_2$. It does not itself participate in the sensor mechanism. The fiber anchorings are not critical. The housing can therefore be designed for large mechanical and thermal loads in a very simple manner. It is furthermore distinguished by compactness and a low weight and is therefore very well suited to use in large fiber links 7a–7d with many pressure measuring points, e.g. in oil production boreholes. A fiber sheath which is suitable for high temperatures and is made e.g. of polyimides or metal, and/or a fiber cable may also be provided for the fibers 3, 4a, 4b, 5a, 5b in the housing 25.

FIG. 8 shows a monomode intermediate fiber 30 in the region of the pressure-tight fiber feedthrough 28c between the fiber segments 5a, 5b. The intermediate fiber 30 serves for absorbing the force of the fiber feedthrough 28c and for enabling the sensor fibers 5a, 5b to be retained largely without any forces. The intermediate fiber 30 preferably has an elliptical core which ensures a fixed axial orientation, largely independent of force, of the birefringence. In order inherently to compensate pressure-dictated phase shifts in the intermediate fiber 30, the polarization or spatial modes ($LP_{01}$, $LP_{11}^{rectilinear}$) of the sensor fiber segments 5a, 5b are transmitted by the same mode or modes of the intermediate fiber 30. For this purpose, the core ellipse of the intermediate fiber 30 is oriented at approximately 45° in the case of polarimetric monomode sensor fiber segments 5a, 5b and approximately parallel or orthogonally to the axes of the segments 5a, 5b in the case of spatial two-mode sensor fibers 5a, 5b. In the latter case, the additional splices 61, 62 are offset transversely in order that the two spatial modes of the segments 5a, 5b are coupled in and out as uniformly as possible.

In all of the exemplary embodiments, the order of the fibers 3, 5a, 5b in the fiber laser 2 can be chosen as desired. In particular, the laser-amplifying fiber 3 can also be arranged at the rear end of the fiber laser 2 or between the two sensor fiber segments 5a, 5b.

Figure 9:
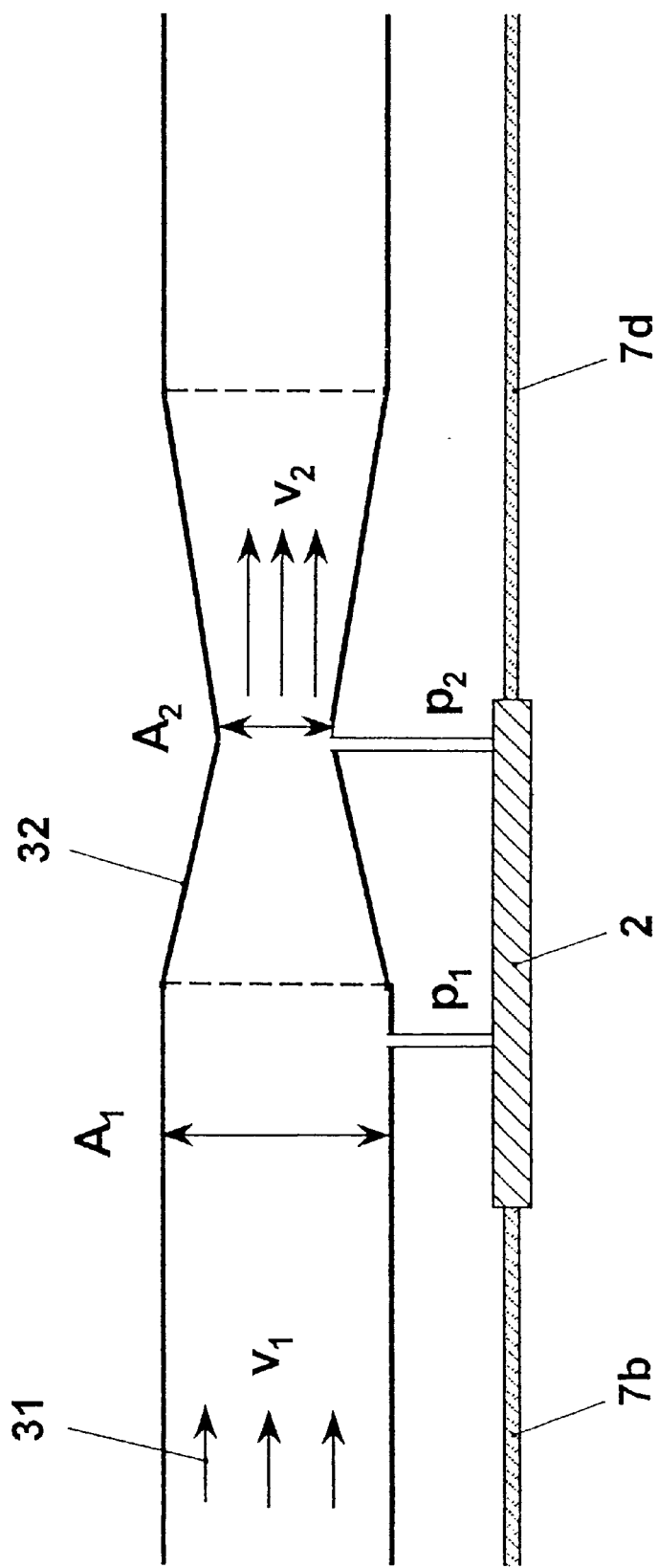
FIG. 9 shows a Venturi tube with differential pressure sensor for determining flow velocities.

FIG. 9 shows a use of a fiber laser differential pressure sensor 1, 25 according to the invention, in the case of which a flow velocity v, of a fluid flow 24 is determined from a differential pressure measurement. In particular, the inlets 26a, 26b of the transducer 1 are connected to a Venturi tube 23 at two points with cross-sectional areas $A_1$ and $A_2$. The flow velocity $v_1$ can be determined from the differential pressure $\Delta p = p1-p2$ in a known manner.

Important advantages of the fiber laser differential pressure sensor 1 disclosed concern: a high measurement accuracy by virtue of the frequency coding of the pressure signal; capability of calibration to absolute pressures and inherent temperature compensation by virtue of the differential coupling of the sensor fiber segments 5a, 5b; a passively optical sensor head and a fiber-optic signal transmission over large distances; and the capability of using commercially available components, in particular erbium-doped amplifier fibers and two-mode sensor fibers with an elliptical core, whose optical properties can be optimized independently of one another.

LIST OF REFERENCE SYMBOLS

1 Fiber laser differential pressure sensor
2 Fiber laser
3 Laser-amplifying fiber, doped fiber
4a, 4b End reflectors, fiber Bragg-grating
5a, 5b Birefringent sensor fiber, sensor fiber segments; fibers with an elliptical core (monomode or bimodal)
51 Fiber core
52 Fiber cladding
53 Side holes
6 90° splice
6' Splice with a transverse offset; 0° splice
61, 62 Splices for intermediate fiber
7a–7d Feed fibers
8 Pumping light source, pumping laser
9 Fiber coupler, wavelength division multiplexer
10a–10e Splices 11 Optical isolator
12 Detection unit
13 Polarization monitoring arrangement
14, 14a, 14b Analyzer, fiber polarizer
15 Detector, photodiode
16 Signal line
17 Electronic evaluation unit
18 Frequency filter
19 Frequency counter
20 Summer
21a, 21b 0°, 45° splices
22 Polarization-maintaining fiber coupler
23 Wavelength division demultiplexer
24 Multichannel detector
25 Housing
26a, 26b Inlets
27a–27d Pressure chambers, housing compartments
28a–28e Pressure-tight fiber feedthroughs
29a Medium 1, fluid 1 (under pressure $p_1$)
29b Medium 2, fluid 2 (under pressure $p_2$)
30 Intermediate fiber
31 Fluid flow
32 Venturi tube
$A_1$, $A_2$ Cross-sectional areas
c Speed of light in a vacuum
L Length of the sensor fiber segments
$L_d$ Length of the laser-amplifying fiber
$\lambda_B$ Bragg wavelength
$\lambda_l, \ldots, \lambda_i$ Emission wavelengths
$\Delta v_B^{(1)}$, $\Delta v_B^{(2)}$ Bandwidths of the fiber Bragg-gratings
$\Delta v_0$, $\Delta v_0'$ Frequency spacing between longitudinal modes
$\Delta v_1$ Fundamental beat frequency
$n_d$, $n_a$, $n_b$ Effective refractive indices
$p_1$, $p_2$ Pressures
$\Delta p$ Differential pressure
$v_1$, $v_2$ Flow velocities

What is claimed is:

1. A fiber laser differential pressure sensor, $\Delta p = p_1 - p_2$, between two pressures, $p_1$ and $p_2$, particularly suitable for pressure measurement in oil boreholes, comprising a pumping light source, feed fibers, a fiber laser, which has a laser-amplifying fiber and at least two end reflectors, a detection unit and an electronic evaluation unit, wherein
   a) at least two sensor fiber segments with a structure that is not rotationally symmetrical are arranged between the end reflectors, and
   b) the sensor fiber segments have an opposite pressure sensitivity of the birefringence,
   c) a first pressure $p_1$ acting on a first sensor fiber segment, and a second pressure $p_2$ acting on a second sensor fiber segment, and
   d) the detection unit and electronic evaluation unit comprise means for determining a birefringence-induced beat frequency.

2. The fiber laser differential pressure sensor as claimed in claim 1, wherein
   a) the sensor fiber segments carry a plurality of polarization modes and/or spatial modes and
   b) an optical coupling with mode exchange is provided between the sensor fiber segments.

3. The fiber laser differential pressure sensor as claimed in claim 2, wherein
   a) the detection unit has, for the purpose of splitting, polarization analysis and detection of received light from a fiber laser, a polarization-maintaining fiber coupler with, on the output side, analyzers oriented at 0° and 45° and two detectors, and
   b) the detectors are connected via a summer to a frequency filter and a frequency counter.

4. The fiber laser differential pressure sensor as claimed in claim 1, wherein the sensor fiber segments have an elliptical core, a "bow-tie" structure, a "panda" structure, a "side-hole" structure, a "D-shape" structure, an elliptical fiber cladding or a partially ground fiber cladding.

5. The fiber laser differential pressure sensor as claimed in claim 1, wherein
   a) the sensor fiber segments carry precisely two polarization modes and are rotated by 90° with respect to one another, or
   b) the sensor fiber segments carry precisely two spatial modes and are rotated by 0° with respect to one another.

6. The fiber laser differential pressure sensor as claimed in claim 1, wherein the sensor fiber segments are of the same type and have the same length.

7. The fiber laser differential pressure sensor as claimed in claim 1, wherein
   a) the end reflectors are fiber Bragg-gratings, and
   b) the Bragg wavelength $\lambda_B$ is a measure of the temperature.

8. The fiber laser differential pressure sensor as claimed in claim 7, wherein the fiber Bragg-gratings are written directly into the laser-amplifying fiber and/or into the sensor fiber segments.

9. The fiber laser differential pressure sensor as claimed in claim 7, wherein the fiber Bragg-gratings are chosen with a different bandwidth, preferably $\Delta v_B^{(1)} = 0.6$ nm and $\Delta v_B^{(2)} = 0.2$ nm.

10. The fiber laser differential pressure sensor as claimed in claim 1, wherein
    a) the sensor fiber is spatially bimodal,
    b) a fiber polarizer is arranged in or beside the fiber laser, and
    c) in particular the Bragg wavelength $\lambda_B$ is chosen in the spectral region of a vanishing group refractive index birefringence of the sensor fiber.

11. The fiber laser differential pressure sensor as claimed in claim 1, wherein
    a) the pumping light source, the fiber laser and the detection unit are optically connected by means of a preferably wavelength-selective fiber coupler,
    b) the detection unit comprises means for detecting a beat frequency in the received light from the fiber laser, and
    c) the electronic evaluation unit has means for determining the beat frequency.

12. The fiber laser differential pressure sensor as claimed in claim 1, wherein
    a) a plurality of fiber lasers of different emission wavelengths are optically connected to a common pumping light source and a detection unit,
    b) the detection unit has a wavelength division demultiplexer and a multichannel detector, and
    c) a multichannel electronic evaluation unit is provided.

13. The fiber laser differential pressure sensor as claimed in claim 1, wherein
    a) a pressure-resistance housing with a plurality of pressure chambers connected by pressure-tight fiber feedthroughs is configured for accommodating a fiber laser,
    b) separate pressure chambers are provided for the sensor fiber segments, said pressure chambers being in direct pressure exchange with at least two media of the first and second pressures $p_1$ and $p_2$, respectively, and c) additional pressure chambers are provided in particular for fiber Bragg-gratings.

14. The fiber laser pressure sensor as claimed in claim 13, wherein
   a) the laser-amplifying fiber is arranged in an additional pressure chamber, in particular together with a fiber Bragg-grating, or
   b) the laser-amplifying fiber comprises the sensor fiber segments, and
   c) the laser-amplifying fiber has at least one fiber Bragg-grating.

15. The use of a fiber-optic differential pressure sensor as claimed in claim 1, wherein
   a) a flow velocity $v_1$ of a fluid flow is determined from a differential pressure measurement, and
   b) the differential pressure measurement is carried out on a Venturi tube.

16. The fiber laser differential pressure sensor as claimed in claim 1, wherein an intermediate fiber is arranged between the sensor fiber segments.

* * * * *